US011543076B2

(12) United States Patent
Kronholz et al.

(10) Patent No.: US 11,543,076 B2
(45) Date of Patent: Jan. 3, 2023

(54) FLUSHABLE PRESSURE VESSEL

(71) Applicant: NPROXX B.V., RK Heerlen (NL)

(72) Inventors: Stephan Kronholz, Julich (DE); Thomas Kluge, Julich (DE); Elmar Ritzerfeld, Aachen (DE); Erich Josef Titz, Duren (DE)

(73) Assignee: NPROXX B.V., RK Heerlen (NL)

(*) Notice: Subject to any disclaimer, the term of this patent is extended or adjusted under 35 U.S.C. 154(b) by 77 days.

(21) Appl. No.: 17/251,090

(22) PCT Filed: Jun. 11, 2019

(86) PCT No.: PCT/EP2019/065213
§ 371 (c)(1),
(2) Date: Dec. 10, 2020

(87) PCT Pub. No.: WO2019/238678
PCT Pub. Date: Dec. 19, 2021

(65) Prior Publication Data
US 2021/0247024 A1    Aug. 12, 2021

(30) Foreign Application Priority Data

Jun. 12, 2018  (EP) .................................. 18177400

(51) Int. Cl.
*F17C 1/02*           (2006.01)
*F17C 5/06*           (2006.01)
(52) U.S. Cl.
CPC .................. *F17C 1/02* (2013.01); *F17C 5/06* (2013.01); *F17C 2201/0109* (2013.01);
(Continued)
(58) Field of Classification Search
CPC ...... F17C 1/02; F17C 5/06; F17C 2201/0109; F17C 2203/0604; F17C 2203/0619;
(Continued)

(56) References Cited

U.S. PATENT DOCUMENTS 3,883,046 A * 5/1975 Thompson ............. B65D 88/62
                                                     383/3
4,231,230 A * 11/1980 Gratzer ................. F25B 43/006
                                                    62/503
(Continued)

FOREIGN PATENT DOCUMENTS

CN          2139600 Y      8/1993
CN          1148679 A      4/1997
(Continued)

OTHER PUBLICATIONS

Office Action dated Feb. 22, 2022 of the Chinese patent application 201980039231.4.

*Primary Examiner* — Timothy P. Kelly
*Assistant Examiner* — Stephanie A Shrieves
(74) *Attorney, Agent, or Firm* — Tarolli, Sundheim, Covell & Tummino LLP

(57) ABSTRACT

A pressure vessel with a flushing lance, a transport container with pressure vessels and methods of filling and producing this pressure vessel are disclosed which comprises an inner vessel, an outer layer applied on the inner vessel, a valve connection piece arranged on one of the terminal caps of the inner vessel and a hollow flushing lance that is open to the outside and is guided through the valve connection piece and held therein in a sealing manner, wherein the flushing lance protrudes into the storage volume and is provided with a perforation along its entire length up to a first end of the flushing lance facing the terminal cap that lies opposite the valve connection piece in the storage volume for a gas exchange with the storage volume, wherein the flushing lance extends to the terminal cap which lies opposite the valve connection piece.

9 Claims, 5 Drawing Sheets

(52) U.S. Cl.
CPC ............... *F17C 2203/0604* (2013.01); *F17C 2203/066* (2013.01); *F17C 2203/0619* (2013.01); *F17C 2203/0673* (2013.01); *F17C 2205/0111* (2013.01); *F17C 2205/0142* (2013.01); *F17C 2205/0305* (2013.01); *F17C 2205/0352* (2013.01); *F17C 2205/0391* (2013.01); *F17C 2221/012* (2013.01); *F17C 2221/014* (2013.01); *F17C 2223/036* (2013.01); *F17C 2225/045* (2013.01); *F17C 2227/044* (2013.01); *F17C 2270/0168* (2013.01); *F17C 2270/0184* (2013.01)

(58) Field of Classification Search
CPC ........ F17C 2203/066; F17C 2203/0673; F17C 2205/0111; F17C 2205/0142; F17C 2205/0305; F17C 2205/0352; F17C 2205/0391; F17C 2221/012; F17C 2221/014; F17C 2223/036; F17C 225/045; F17C 2227/044; F17C 2270/0168; F17C 2270/0184; F17C 1/00; Y02E 60/32
USPC .......................................................... 141/12
See application file for complete search history.

(56) References Cited

U.S. PATENT DOCUMENTS

| | | | |
|---|---|---|---|
| 5,022,442 A * | 6/1991 | Bird | B01F 23/10 141/4 |
| 5,758,796 A * | 6/1998 | Nishimura | F17C 1/06 220/651 |
| 5,813,429 A | 9/1998 | Ohtaka et al. | |
| 2002/0023689 A1 | 2/2002 | Sindermann | |
| 2009/0321443 A1 | 12/2009 | Taggart | |
| 2010/0018972 A1* | 1/2010 | Kao | B65D 51/1633 220/367.1 |
| 2014/0097098 A1* | 4/2014 | Weickert | F17C 11/007 141/4 |
| 2014/0290789 A1 | 10/2014 | Dailly | |
| 2015/0108137 A1* | 4/2015 | Nettis | F17C 5/06 220/560.04 |
| 2015/0345707 A1* | 12/2015 | Landeck | F17C 13/001 165/53 |
| 2015/0345708 A1* | 12/2015 | Sloan | F17C 13/002 220/560.12 |
| 2019/0285227 A1* | 9/2019 | Veenstra | F17C 1/02 |

FOREIGN PATENT DOCUMENTS

| | | |
|---|---|---|
| CN | 106195413 A | 12/2016 |
| CN | 206439628 A | 8/2017 |
| DE | 102004014010 A1 | 10/2005 |
| DE | 102012200554 A1 | 7/2013 |
| FR | 2935774 A1 | 3/2010 |
| JP | 2002181295 A | 6/2002 |
| WO | 2013083155 A1 | 6/2013 |

* cited by examiner

FLUSHABLE PRESSURE VESSEL

RELATED APPLICATIONS

The present invention is a U.S. National Stage under 35 USC 371 patent application, claiming priority to Serial No. PCT/EP2019/065213, filed on 11 Jun. 2019; which claims priority of EP 18177400.1, filed on 12 Jun. 2018, the entirety of both of which are incorporated herein by reference.

FIELD OF THE INVENTION

The invention relates to a pressure vessel with a flushing lance, a transport container with such pressure vessels, a method of filling such pressure vessel and a method of producing the pressure vessel.

BACKGROUND OF THE INVENTION

The market for pressure vessels reinforced with fiber composite material grows continually. The increasing production of natural gas and fracking gas makes storage in pressure vessels indispensable, especially in countries without a corresponding pipeline network. In addition, there is the automotive sector, where the development of fuel cell vehicles is greatly promoted in which the fuel, in the form of gaseous hydrogen, is to be stored at high pressure in pressure vessels. For transporting the pressure vessels, light-weight vessels are desired since the transport of pressure vessels with high weight consumes an unnecessarily high amount of energy, leading to excessive transport costs.

Presently used cylindrical pressure vessels have a reinforcement layer made of fiber composite material with fibers embedded in a matrix material which is wound, as an outer layer, around an inner vessel (called a liner) of the pressure vessel, which acts as the winding core, by means of a winding method. While the inner vessel guarantees, for instance, the gas tightness of the pressure vessel, the reinforcement layer of fiber composite material provides the pressure vessel with necessary mechanical stability. In pressure vessels of type 3, a mechanical inner vessel (metallic liner), e. g. of aluminium or steel, is used; in pressure vessels of type 4, the inner vessel (liner) is made of plastic.

Pressure vessels are filled with filling gas which is to have a desired degree of purity. Since used-up pressure vessels are normally filled for return transport with a transport gas (for instance nitrogen) other than the respective filling gas (for instance hydrogen), or are to be filled alternately with different filling gases, depending on the requirements, the pressure vessels must be flushed many times before being filled with the desired filling gas so that the gas can be filled into the pressure vessel at the desired degree of purity (for instance purer than 99.9% or purer than 99.999%). The flushing procedures for achieving the degree of purity specified by the customer are expensive and require great effort since flushing and, if necessary, a plurality of fillings must be performed with the filling gas in order to achieve the specified degree of purity. Thus, the fillings carried out to achieve this degree of purity result in used-up gas mixtures and therefore in waste.

Consequently, it is desirable to have a pressure vessel and a corresponding filling method available by means of which the effort for flushing and the gas consumption for achieving the desired degree of purity can be reduced.

SUMMARY OF THE INVENTION

It is an object of the present invention to provide a pressure vessel and a corresponding filling method by means of which the effort of flushing can be reduced and the consumption of gas necessary to achieve the desired degree of purity can be lowered.

This object is achieved by a pressure vessel comprising an inner vessel made of an inner vessel material, having a cylindrical middle part with a cylinder axis and having two terminal caps that seal the cylindrical middle part so as to provide a storage volume in the pressure vessel, an outer layer, which is applied to the inner vessel in order to reinforce said inner vessel, a valve connection piece that is arranged on one of the terminal caps so as to fill and empty the storage volume with a filling gas at a desired degree of purity, and a hollow flushing lance that is open to the outside and is guided through the valve connection piece and held therein in a sealing manner with respect to the valve connection piece, wherein the flushing lance protrudes into the storage volume and is provided with a perforation along its entire length up to a first end of the flushing lance facing the terminal cap that lies opposite the valve connection piece in the storage volume for a gas exchange with the storage volume, wherein the flushing lance extends so far to the terminal cap, which lies opposite the valve connection piece, that the gas exchange is performed throughout the perforation of the flushing lance up to the opposite terminal cap, where the flushing lance is produced at least in the region within the storage volume of a dimensionally stable material and wherein the first end of the flushing lance is arranged flee-floating in the storage volume of the pressure vessel, wherein an additional weight is arranged on the first end of the flushing lance.

The pressure vessel can be used for filling gases of all kinds; preferably for highly volatile gases like hydrogen. The inner vessel material is preferably a plastic, for instance PE, PA, PP. These materials have a very low gas permeability for e. g. hydrogen. The outer layer can also be made of any material suited for the purpose. In case of an outer layer of fiber composite material, it consists of fibers, embedded in a matrix material so as to provide a particularly high mechanical strength of the outer layer of the pressure vessel. In this way, impermeability to gas is provided by the inner vessel and mechanical strength by the outer layer for the pressure vessel. The flushing lance can be connected to the valve connection piece permanently or so that it can be disassembled. The perforation of the flushing lance allows the filling gas to flow in evenly over the entire length of the pressure vessel and ensures adequate mixing of the filling gas with the gas with which the pressure vessel is pre-filled. In this manner, formation of a zone of no mixing or of insufficient mixing in the pressure vessel during filling is prevented. Such a zone is formed if the gas with which the vessel has been pre-filled cannot escape through a second valve (as is indeed not provided on the pressure vessel according to the invention) at the opposite end.

The flushing lance can be made of any suitable material which, on the one hand, can be provided with a perforation for gas exchange out of and into the flushing lance and which, on the other hand, can withstand high temperature stresses due to multiple fillings at high pressure without being damaged; for instance EPP. Because of good and thorough mixing of gases and the corresponding particularly high convection, the temperature load in the pressure vessel according to the invention is less than 160° C. in case of a filling at 500 bar. In contrast, conventional pressure vessels with no flushing lance reach temperatures of up to 300° C. The abovementioned temperatures refer to local maximum values in the gas. The possibility of flushing the storage volume is greatly improved by the flushing lance according to the invention since circulation of the gas filled into the pressure vessel is increased, by an increase in volume with direct gas exchange due to perforation of the flushing lance, which in addition penetrates far into the storage volume, to the point that all areas of the storage volume, including the area directly at the opposite terminal cap, participate in gas exchange. In this manner, the number of filling and emptying cycles necessary for reaching the desired degree of purity of the filling gas in the pressure vessel can be reduced to less than three, if so desired, even in case of a high degree of purity. In the state of the art, current pressure vessels are flushed at least three times to achieve low degrees of purity, at least five times for high desired degrees of purity. The cost savings, for instance for hydrogen as the filling gas, are considerable. The process time saved in filling the pressure vessels also contributes to save costs.

The pressure vessel according to the invention thus makes it possible to reduce flushing efforts and to lower gas consumption necessary to achieve the desired degree of purity.

The dimensional stability of the flushing lance allows insertion of the flushing lance into the storage volume and prevents damage to the inner vessel caused by insertion of the lance and scratching of the inner vessel interior.

In one embodiment, the dimensionally stable material is a plastic which is softer than the material of the inner vessel. The term "softer" refers to the hardness degree of a material. The less hard a material, the softer it is. For plastic materials used for the inner vessel and the lance, for example, it is advantageous if the lance material has a lower Shore value than the material of the inner vessel, with Shore A designating soft materials and Shore D designating comparatively harder materials. PE LD material has a Shore hardness of D, whereas rubber, for instance, has a Shore value of A. Thus, a lance made of rubber in an inner vessel made of PE-LD would conform to the above embodiment. In this way, damage to the inner vessel caused by freely suspended lances or during insertion of lances in the case of contact of the interior of the inner vessel with the flushing lance is prevented. Another advantage over metallic lances is that in case of connection to a tubing in a transport container, the former are frequently subject to fatigue failure because of their material, causing the lance to fall into the pressure vessel, damaging the inner vessel. In addition, the broken lance can be removed from the vessel only with difficulty. These disadvantages are avoided with a flushing lance of plastic material.

Due to the fact that the first end of the flushing lance is arranged free-floating in the storage volume of the pressure vessel, the lance is supported in the valve connection piece only at its second end. The dimensional stability ensures a free-floating first end in the interior space. Such lances can be positioned quickly since no counter surface needs to hit by the lance on the side of the opposite terminal cap. Furthermore, such free-floating lances enhance the mixing effect because when the pressure vessel is filled with filling gas, the free-floating first end of the flushing lance, like a magnetic stir bar, causes a turbulence by vibrating freely, thus inducing an additional stirring effect in the filling gas.

By arranging an additional weight on the first end of the flushing lance, the inertial mass of the flushing lance is increased so that during an upright transport, with the valve connection piece at the top of the pressure vessel and the additional weight at the bottom of the pressure vessel, in the case of impacts the flushing lance is subjected to lesser vibrations with smaller amplitudes and can therefore not hit the interior of the inner vessel, or hit it less often. Such pressure vessels are particularly suited for an upright transport with a vertical flushing lance. The additional weight can consist of a suitable material, for instance the same material as the flushing lance or of metal.

As an alternative to the free-floating flushing lance, the first end of the flushing lance can be suitably connected to the terminal cap opposite to the valve connection. In this way, the flushing lance is fixed inside the storage volume on both sides so that impacts against the pressure vessel can no longer cause the flushing lance to hit against the inner vessel and to damage it. The pressure vessel can then be transported in any position without the risk of the flushing lance hitting the inside of the inner vessel during transport.

The opposite terminal cap can have a suitably designed loose bearing for fixing the flushing lance to prevent movements vertical to the cylinder axis of the inner vessel, in which the flushing lance is nevertheless supported movably reversibly in parallel to the cylinder axis of the inner vessel. The loose bearing is a guide in which the flushing lance is inserted and retained without being fixed into position in its longitudinal direction (direction of the cylinder axis of the inner vessel). Therefore, the flushing lance is supported in its longitudinal direction such that even in case of alterations in length of the pressure vessel caused by the pressure filling, without tensions, the lance cannot perform any movements vertically to the longitudinal direction, which could damage the inner vessel. The loose bearing can have any shape suited for this purpose. The material of the loose bearing is preferably the same as that of the inner vessel.

The loose bearing can be formed as a hollow sleeve with an inner diameter which is the same or larger than an outer diameter of the flushing lance, at least in the area of the opposite terminal cap, the sleeve comprising an insertion funnel which opens in the direction of the valve connection piece. Such a loose bearing is easy to manufacture and the flushing lance is easy to insert into the sleeve as into a loose bearing, with the insertion funnel facilitating the insertion since it can securely accommodate the first end of the lance even in case of deviations of the lance from the cylinder axis.

The loose bearing can be made of an elastic material. The first end of the flushing lance is inserted in the bearing in contrast to a certain resistance and must slightly stretch the bearing if the inner diameter of the bearing is smaller than the outer diameter of the lance, leading to a more secure fit of the flushing lance in the loose bearing. If the dimensional relations are the other way round, at least the elastic material reduces the transmission of any impacts on the pressure vessel to the flushing lance.

In another embodiment, the flushing lance is reversibly connected to the valve connection piece by suitable means, allowing removal of the flushing lance, if desired, for instance for maintenance purposes.

In a different embodiment, the material of the flushing lance is so stiff that as a gas filling of the storage volume is drawn off by suction through the flushing lance, said flushing lance remains dimensionally stable and its shape does not collapse. This allows multiple reliable cycles of filling and evacuation of the storage volume to establish a desired degree of purity without impairing the gas flow of the gas that is being evacuated.

In another embodiment, the perforation of the flushing lance comprises gas inlet and gas outlet openings whose number, position and diameter are dimensioned such that both a gas filling is thoroughly mixed in the storage volume and that the durations of the procedures of filling and emptying the storage volume with the filling gas are optimized. The diameters of the openings, holes and slots serving as perforations, as well as their distance from one another, can vary. The perforation should furthermore be designed such that desired filling times and flow rates of the filling gas or the gas filling, respectively, through the flushing lance are allowed. A larger number of inlet and outlet openings (where the gas inlet openings may also be gas outlet openings at the same time) reduces the filling and evacuation times; especially a larger number of these openings in the area of the first end increases thorough mixing of the gas in the area of the opposite terminal cap, causing the "bottom-side" gas to flow through the storage volume due to the filling process.

The invention further comprises a transport container comprising a plurality of pressure vessels according to the invention whose storage volumes are connected to one another by way of a common sealable pipe system by way of the respective valve connection pieces and a respective second end of the flushing lance. Pressure vessels are commonly transported in a respective transport unit (in this case, a container) with interconnection of the individual storage volumes. The gas content of the containers can be controlled via the pipe system. The pressure vessels are transported in the transport orientation predefined by the container; here, for instance, in a vertical orientation, where for safety purposes the valve connections are preferably arranged on the upper side so that the flushing lance extends from the valve connection piece vertically downward into the pressure vessel.

In this way, the transport container according to the invention makes it possible to reduce the effort of flushing and to lower the gas consumption necessary for reaching the desired degree of purity.

In one embodiment, for this purpose, the pipe system is connected to a device for filling the pressure vessels with the filling gas and for pumping out the gas filling in the pressure vessels. In this manner, the transport time or the immobilization time in the container can be used to flush the storage volume. The device can be, for instance, a combination of a pumping device and a gas inlet device for an external gas tank or gas supply.

The invention furthermore relates to a method for filling a pressure vessel according to the invention with a filling gas at a desired degree of purity in the pressure vessel that comprises an inner vessel produced from an inner vessel material having a cylindrical middle part having a cylinder axis and having two terminal caps that seal the cylindrical middle part so as to provide a storage volume in the pressure vessel, an outer layer which is applied to the inner vessel in order to reinforce said inner vessel, a valve connection piece that is arranged on one of the terminal caps and a hollow flushing lance that is open to the outside and is guided through the valve connection piece and held therein in a sealing manner with respect to the valve connection piece; comprising the following steps:

filling the pressure vessel with the filling gas for a gas exchange with the storage volume by way of the flushing lance that protrudes into the storage volume and is provided with a perforation along its entire length up to a first end of the flushing lance facing the terminal cap that lies opposite the valve connection piece in the storage volume;

performing the gas exchange up to the opposite terminal cap in that the flushing lance extends far enough to the terminal cap that lies opposite the valve connection piece;

subsequently pumping out the accordingly thoroughly-mixed gas filling that is located in the pressure vessel by means of a suitable device through the flushing lance to the exterior of the pressure vessel; and repeating the previous steps until the gas filling in the pressure vessel corresponds to the filling gas at the desired degree of purity.

During pumping out, the gas composition of the gas filling can be measured by a suitable analyzing device for determining whether an additional filling and pumping cycle must be performed to achieve the desired degree of purity. The gas analysis can be omitted if there is sufficient experience with the procedures of filling and pumping out so that the degree of purity is determined solely by the number of filling and pumping cycles.

In this way, the method according to the invention makes it possible to reduce the effort for flushing and to lower the gas consumption necessary to achieve the desired degree of purity.

The invention further relates to a method of manufacturing a pressure vessel according to the invention, comprising the following steps:

providing an inner vessel produced from an inner vessel material having a cylindrical middle part with a cylinder axis and having two terminal caps that seal the cylindrical middle part so as to provide a storage volume, said inner vessel comprising an outer layer that is applied thereto in order to reinforce said inner vessel, wherein a valve connection piece is provided on one of the terminal caps so as to receive a valve in order to seal the storage volume;

guiding a hollow flushing lance that is open to the outside through the valve connection piece, wherein the flushing lance is configured so as to protrude into the storage volume and is provided with a perforation along its entire length up to a first end of the flushing lance facing the terminal cap that lies opposite the valve connection piece in the storage volume for a gas exchange with the storage volume, wherein the flushing lance extends so far to the terminal cap, which lies opposite the valve connection piece, that the gas exchange takes place throughout the perforation of the flushing lance up to the opposite terminal cap; and fixing the flushing lance to the valve connection piece so that said flushing lance is held by the valve connection piece in a sealing manner with respect to the valve connection piece.

The method according to the invention thus makes it possible to manufacture a pressure vessel by means of which the effort for flushing can be reduced and the gas consumption necessary to achieve the desired degree of purity can be lowered.

BRIEF DESCRIPTION OF FIGURES

These and other aspects of the invention are shown in detail in the figures as follows.

DETAILED DESCRIPTION OF EMBODIMENTS

Figure 1:
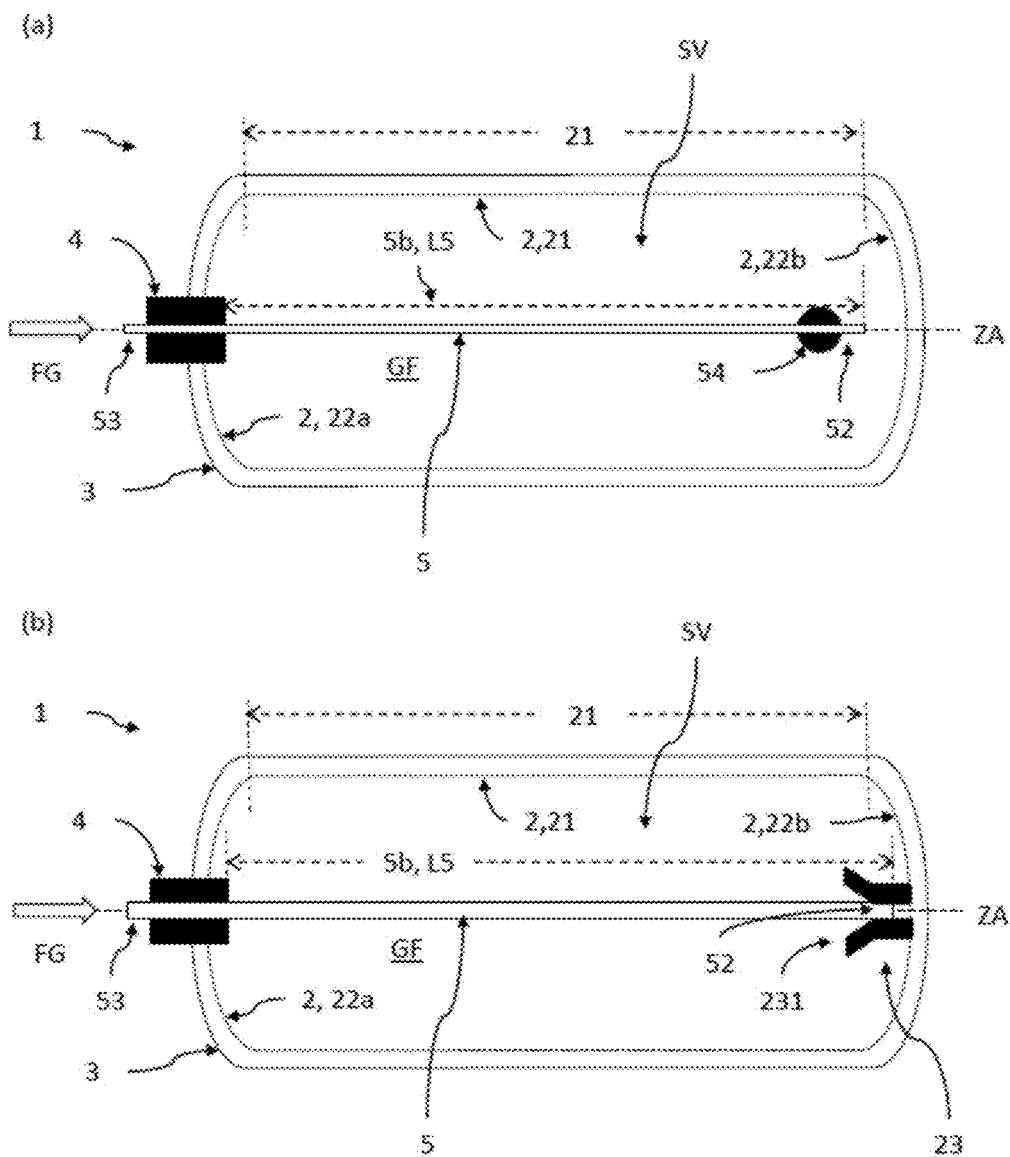
FIG. 1: two embodiments of the pressure vessel according to the invention in lateral section, (a) with free-floating flushing lance and (b) with the flushing lance fixed at both ends.

FIG. 1 shows two embodiments of the pressure vessel 1 according to the invention in lateral section, (a) with free-floating flushing lance 5 and (b) with the flushing lance 5 fixed at both ends 52, 53. The pressure vessel 1 comprises an inner vessel 2 produced from an inner vessel material having a cylindrical middle part 21 with a cylinder axis ZA and having two terminal caps 22a, 22b that seal the cylindrical middle part 21 so as to provide a storage volume SV in the pressure vessel. An outer layer 3 is applied on the inner vessel 2 in order to mechanically reinforce said inner vessel; for instance, a wound outer layer made of fiber composite material. The valve connection piece 4 for filling and emptying the storage volume SV with (or of) a filling gas FG having a desired degree of purity RG is arranged on one of the terminal caps 22a, whereas the opposite terminal cap 22b has no such connection. Since the valve connection piece 4 provides a connection to the storage volume SV, a hollow flushing lance 5 that is open to the outside is guided through the valve connection piece 4 and held therein in a sealing manner with respect to the valve connection piece 4. This flushing lance 5 protrudes into the storage volume SV and is provided with a perforation 51 along its entire length L5 up to a first end 52 facing the terminal cap 22b that lies opposite the valve connection piece 4 in the storage volume SV for a gas exchange with the storage volume. The flushing lance 5 extends so far to the opposite terminal cap 22b that the gas exchange takes place throughout the perforation 51 of the flushing lance 5 up to the opposite terminal cap 22b. At least in the area 5b within the storage volume SV, the flushing lance 5 is produced of a dimensionally stable material, for instance a plastic which is softer than the material of the inner vessel 2. The material of the flushing lance 5 is so stiff, however, that as a gas filling GF of the storage volume SV is drawn off by means of suction through the flushing lance 5, said flushing lance remains dimensionally stable and its shape does not collapse. In FIG. 1a, the first end 52 of the flushing lance 5 is arranged so as to be free-floating in the storage volume SV of the pressure vessel 1. In this embodiment, an additional weight 54 is arranged on the first end 52 of the flushing lance 5. The term "on the first end" designates, in this context, not only the first end 52 but also a surrounding area, where in this case the additional weight 54, for instance a ball made of lead or other metal, is fastened. In FIG. 1b, the first end 52 of the flushing lance 5 is connected to the terminal cap 22b opposite to the valve connection 4 by means of a loose bearing 23, preventing movements of the flushing lance 5 vertical to the cylinder axis ZA of the inner vessel. However, the flushing lance 5 is supported movably reversibly in parallel to the cylinder axis ZA of the inner vessel 2 so as to be able to compensate for alterations in length of the pressure vessel 1 which occur during pressure filling. The loose bearing 23 is embodied here as a hollow sleeve having an inner diameter equal to the outer diameter of the flushing lance 5, the sleeve 23 comprising an insertion funnel 231 which opens in the direction of the valve connection piece 4. The loose bearing 23 can be made of an elastic material. Furthermore, the flushing lance 5 is reversibly connected to the valve connection piece 4 by suitable means (see also FIG. 2).

Figure 2:
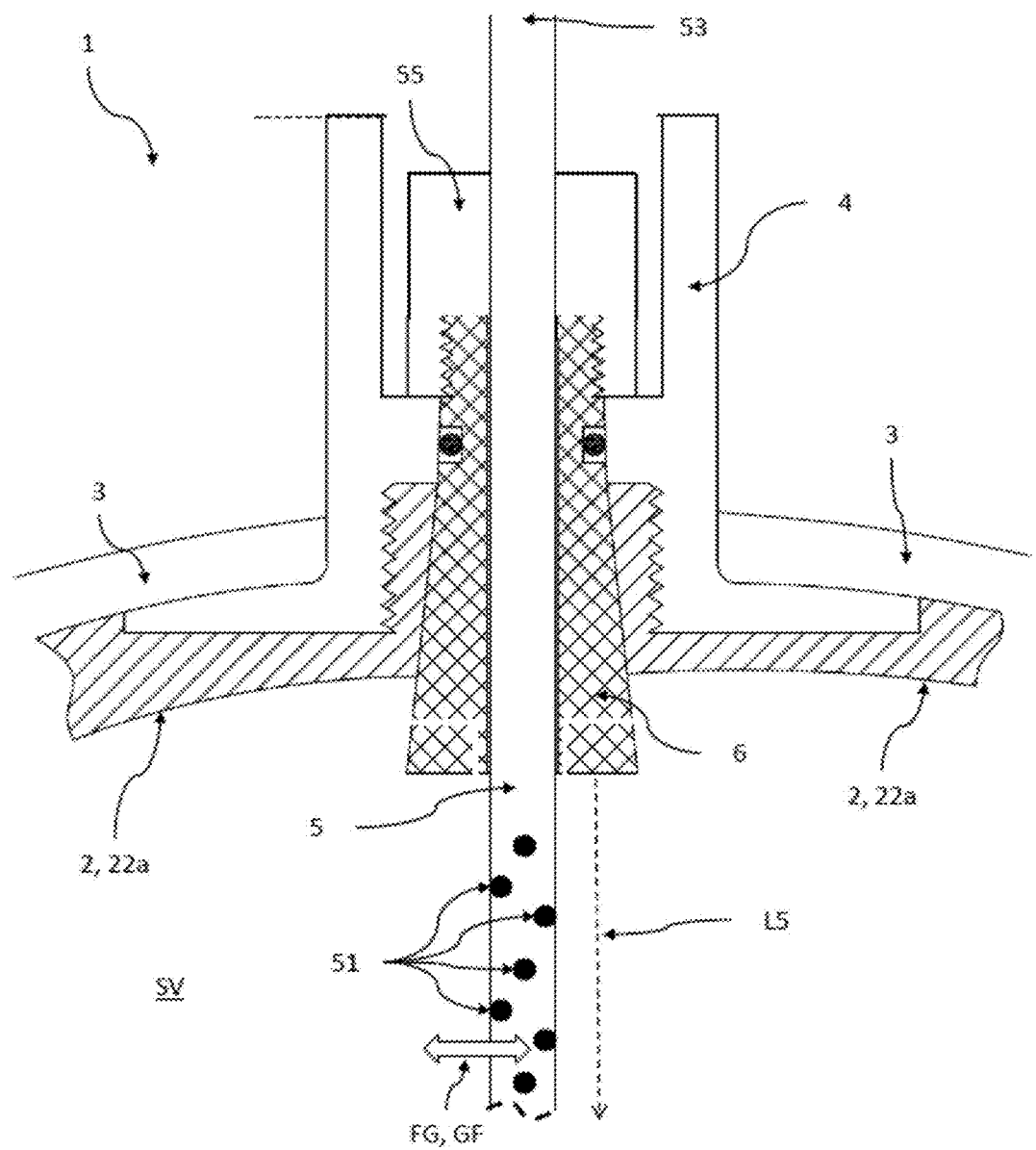
FIG. 2: an embodiment of the pressure vessel with flushing lance in a partial view.

FIG. 2 shows an embodiment of the pressure vessel 1 with flushing lance 5 in a partial view of the area of the terminal cap 22a at the valve connection piece 4 which is here fastened to the terminal cap 22a by means of a screw-type connection and provides a sealing with respect to the inner vessel 2 by means of a sealing cone 6. The vessel is provided with an outer layer 3 for reinforcement. The perforation 51 of the flushing lance 5 comprises gas inlet and gas outlet openings whose number, position and diameter are dimensioned such that both a gas filling GF is thoroughly mixed in the storage volume SV and that the durations of the procedures of filling and emptying the storage volume SV with the filling gas FG are optimized. The circular perforations 51 shown here are only one example of possible perforations 5. In other embodiments, the flushing lance may comprise longitudinal, oval or other perforations 5. The distance and the size of the perforations 5 may also vary depending on the embodiment.

Figure 3:
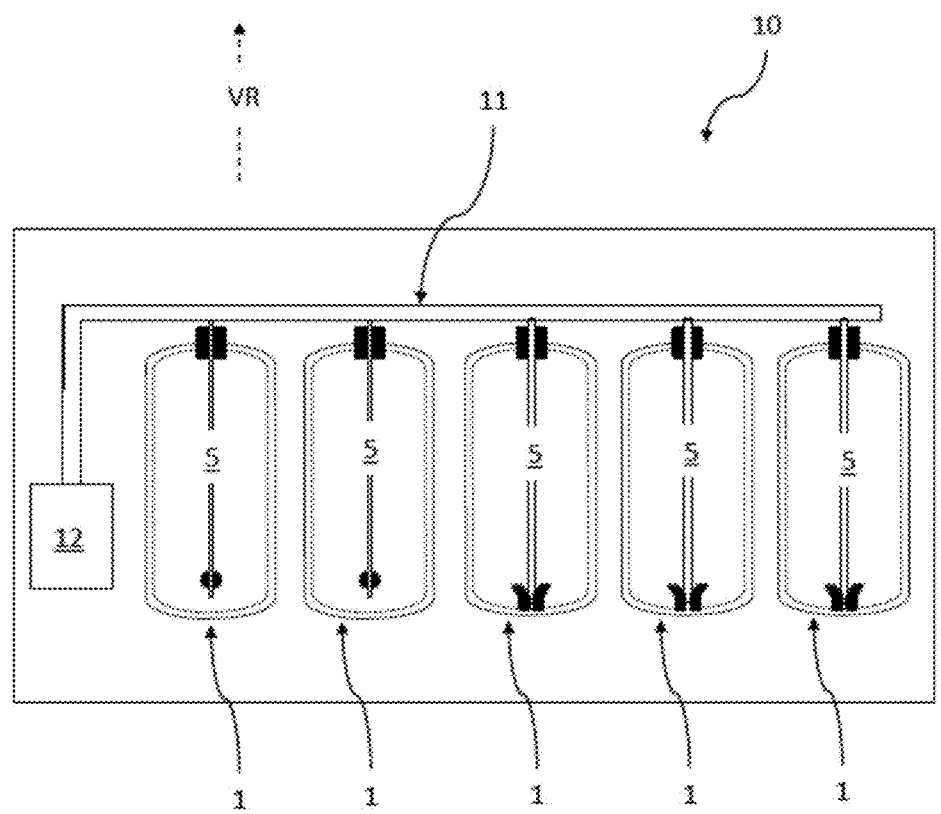
FIG. 3: an embodiment of the transport container according to the invention.

FIG. 3 shows an embodiment of the transport container 10 according to the invention which here comprises, by way of example, five pressure vessels 1 according to the invention, two of the pressure vessels 1 containing free-floating flushing lances 5 and the other three pressure vessels 1 containing flushing lances 5 which are fixed on both sides. For the details on the pressure vessels 1, we refer to FIG. 1. The storage volumes SV of the pressure vessels 1 are connected to one another by way of a common sealable pipe system 11 by way of the respective valve connection pieces 4 and a respective second end 53 of the flushing lance 5, the pipe system 11 being additionally connected to a device 12 so as to fill the pressure vessels 1 with the filling gas and to pump out the gas filling that is located within the pressure vessels 1. Such a device 12 within the transport container 10 makes it possible to reduce the flushing effort and to lower the gas consumption necessary to achieve the desired degree of purity RG. Hydrogen transport containers according to the state of the art are flushed at least 3-6 times (depending on the desired degree of purity) so as to remove the unloaded transport gas nitrogen before the next filling. In case of an assumed storage capacity of 1000 kg of hydrogen in a 40-feet container and a hydrogen price of 7 €/kg, one flushing procedure results in costs of 7000 € for consumed hydrogen. Five flushings therefore result in hydrogen costs of 35,000 €. If greater work efforts are included, the costs of five flushings make up in total approximately 50,000 €. With the pressure vessel 1 according to the invention, half of the flushing costs can be saved with the flushing lance 5. To achieve a degree of purity of 5.0 (which corresponds to a purity of 99.999%), only three flushings are needed with the pressure vessel 1 according to the invention, whereas pressure vessels according to the state of the art require six flushings or more to obtain the same result.

Figure 4:
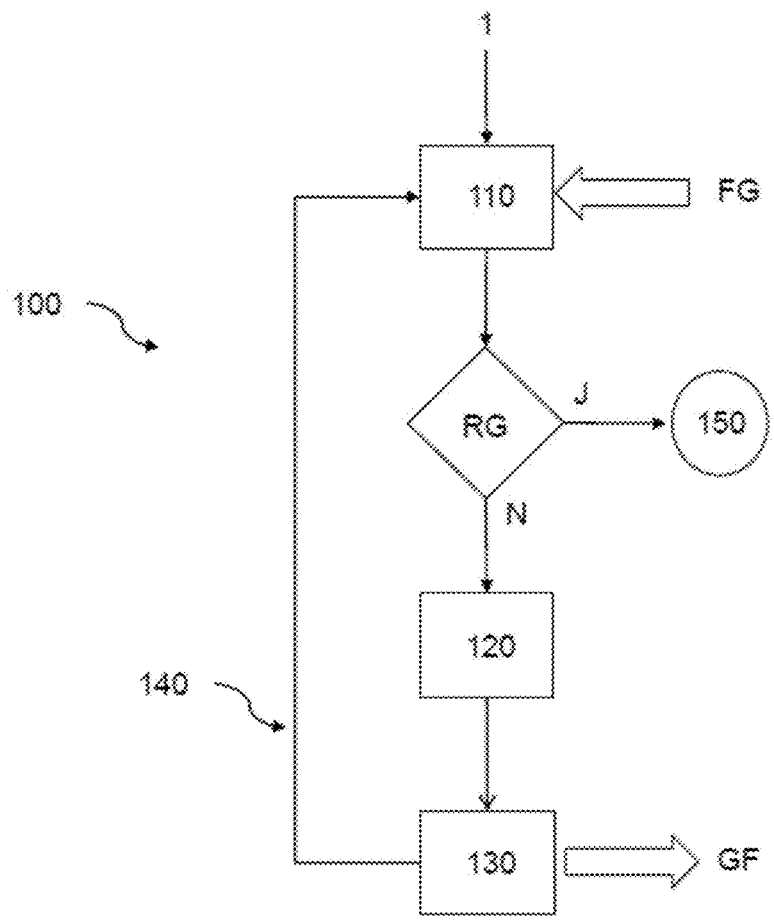
FIG. 4: an embodiment of the method according to the invention for filling the pressure vessel according to the invention.

FIG. 4 shows an embodiment of the method 100 of the present invention for filling the pressure vessel 1 according to the invention (see also FIGS. 1 and 2) with a filling gas FG having a desired degree of purity RG in the pressure vessel 1, comprising the subsequent steps of filling 110 the pressure vessel 1 with the filling gas FG for a gas exchange with the storage volume SP by way of the flushing lance 5 that protrudes into the storage volume SV and is provided with a perforation 51 along its entire length L5 up to a first end 52 of the flushing lance 5 facing the terminal cap 22b that lies opposite the valve connection piece 4 in the storage volume SV; of performing 120 the gas exchange up to the opposite terminal cap 22b in that the flushing lance 5 extends far enough to the terminal cap 22b that lies opposite the valve connection piece 4; of subsequently pumping out 130 the accordingly thoroughly-mixed gas filling GF that is located in the pressure vessel 1 by means of a suitable device 12 through the flushing lance 5 to the exterior of the pressure vessel; and of repeating 140 the previous steps until the gas filling GF in the pressure vessel corresponds to the filling gas FG at the desired degree of purity RG. Advantageously, the composition of the pumped-out gas filling can be measured for this purpose. As soon as it exhibits the desired degree of purity, the pressure vessel 1 needs to be filled only once more with the filling gas to ensure that the storage volume is filled with gas of the desired degree of purity. After this, the filling process 100 is stopped 150 because the desired degree of purity RG has been reached.

Figure 5:
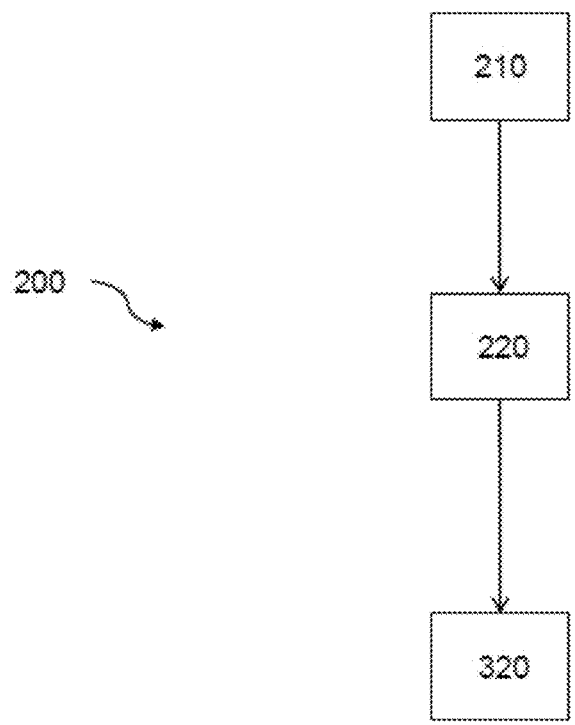
FIG. 5: an embodiment of the method according to the invention for manufacturing the pressure vessel according to the invention.

FIG. 5 shows an embodiment of the method 200 according to the invention for manufacturing the pressure vessel 1 according to the invention, comprising the following steps of providing 210 a pressure vessel as shown in FIG. 1 without a flushing lance 5, of guiding 220 a hollow flushing lance 5 that is open to the outside through the valve connection piece 4, wherein the flushing lance 5 is configured so as to protrude into the storage volume SV and is provided with a perforation 51 along its entire length L5 up to a first end 52 of the flushing lance 5 facing the terminal cap 22b that lies opposite the valve connection piece 4 in the storage volume SV for a gas exchange with the storage volume, wherein the flushing lance 5 extends so far to the terminal cap 22b that lies opposite the valve connection piece 4 that the gas exchange takes place throughout the perforation 51 of the flushing lance 5 up to the opposite terminal cap 22b; and of fixing 230 the flushing lance 5 to the valve connection piece 4 so that said flushing lance is held by the valve connection piece 4 in a sealing manner with respect to the valve connection piece 4. Now the method according to FIG. 4 can be applied to the pressure vessel 1 manufactured in this manner.

The embodiments described here are only examples of the present invention and are therefore not to be understood as limiting. Alternative embodiments considered by the person skilled in the art are equally comprised by the scope of protection of the present invention.

LIST OF REFERENCE NUMERALS 1 pressure vessel
2 inner vessel
21 cylindrical middle part
22a sealing terminal cap on the side of the valve connection piece
22b opposite terminal cap
23 loose bearing on opposite terminal cap
231 open insertion funnel
3 outer layer of fiber composite material
4 valve connection piece
5 flushing lance
5b area of flushing lance in the storage volume
51 perforation
52 first end of flushing lance
53 second end of flushing lance
54 additional weight
55 means of fastening the flushing lance to the valve connection piece
6 sealing cone
10 transport container according to the invention
11 pipe system
12 device for filling the pressure vessels with filling gas and for pumping out the gas filling in the pressure vessels
100 method of filling a pressure vessel according to the invention
110 method of filling the pressure vessel with the filling gas for gas exchange with the storage volume
120 performing gas exchange up to the opposite terminal cap
130 subsequent pumping out of the thoroughly mixed gas filling
140 repeating the preceding steps
150 end of filling method
200 method of manufacturing a pressure vessel according to the invention
210 providing a pressure vessel without flushing lance
220 guiding a flushing lance through the valve connection piece
230 fixing the flushing lance to the valve connection piece
FG filling gas for filling the storage volume
GF gas filling of the storage volume
L5 length of flushing lance in the storage volume
RG desired degree of purity of the gas filling in the pressure vessel
SV storage volume
VR vertical direction
ZA cylinder axis

The invention claimed is:

1. A pressure vessel comprising:
an inner vessel produced from an inner vessel material having a cylindrical middle part with a cylinder axis and having first and second terminal caps that seal the cylindrical middle part so as to provide a storage volume in the pressure vessel;
an outer layer applied on the inner vessel to reinforce the inner vessel;
a valve connection piece arranged on the second terminal cap and configured to fill and empty the storage volume with a filling gas at a desired degree of purity;
a hollow flushing lance that is open to the outside and is guided through the valve connection piece and held therein in a sealing manner with respect to the valve connection piece, the flushing lance having a first end facing the first terminal cap, which lies opposite the valve connection piece in the storage volume for a gas exchange with the storage volume; and
an additional weight arranged on the first end of the flushing lance,
wherein the flushing lance protrudes into the storage volume and is provided with a perforation along its entire length up to the first end of the flushing lance,
wherein the flushing lance extends so far to the first terminal cap that the gas exchange takes place throughout the perforation of the flushing lance up to the first terminal cap, the flushing lance being produced at least in an area within the storage volume from a dimensionally stable material, and
wherein the first end of the flushing lance is arranged free-floating in the storage volume of the pressure vessel.

2. The pressure vessel of claim 1, wherein the dimensionally stable material is a plastic that is softer than the material of the inner vessel.

3. The pressure vessel of claim 1, wherein the flushing lance is connected in a reversible manner by way of suitable means to the valve connection piece.

4. The pressure vessel of claim 1, wherein the material of the flushing lance is so stiff that as the gas filling of the storage volume is drawn off by suction through the flushing lance, the flushing lance remains dimensionally stable and its shape does not collapse.

5. The pressure vessel of claim 1, wherein the perforation of the flushing lance comprises gas inlet openings and gas outlet openings, whose number, position and diameter are dimensioned such that thorough mixing of the gas filling in the storage volume as well as durations of the procedures of filling and emptying the storage volume with, or of, the filling gas are optimized.

6. A transport container comprising a plurality of pressure vessels of claim 1, the storage volumes of which are connected to one another by way of a common sealable pipe system coupled to the respective valve connection pieces and a respective second end of the flushing lance.

7. The transport container of claim 6, wherein the pipe system is connected to a device so as to fill the pressure vessels with the filling gas and to pump out the gas filling that is located within the pressure vessels.

8. A method of filling a pressure vessel with a filling gas at a desired degree of purity, the pressure vessel comprising:
 an inner vessel produced from an inner vessel material having a cylindrical middle part having a cylinder axis and having first and second terminal caps that seal the cylindrical middle part so as to provide a storage volume in the pressure vessel;
 an outer layer applied on the inner vessel in order to reinforce said inner vessel;
 a valve connection piece on the second terminal cap;
 a hollow flushing lance that is open to the outside and is guided through the valve connection piece and held therein in a sealing manner with respect to the valve connection piece, the flushing lance having a first end facing the first terminal cap, which lies opposite the valve connection piece in the storage volume; and
 an additional weight arranged on the first end of the flushing lance,
the method comprising:
 filling the pressure vessel with the filling gas for a gas exchange with the storage volume by way of the flushing lance that protrudes into the storage volume and is provided with a perforation along its entire length up to the first end of the flushing lance;
 performing the gas exchange up to the opposite terminal cap, in that the flushing lance extends far enough to the first terminal cap;
 subsequently pumping out a resultant mixed gas filling that is located in the pressure vessel through the flushing lance to the exterior of the pressure vessel; and
 repeating the filling the pressure vessel, the performing the gas exchange, and the pumping out of the resultant mixed gas filling until the gas filling in the pressure vessel corresponds to the filling gas at the desired degree of purity.

9. A method of producing a pressure vessel, the method comprising:
 providing an inner vessel produced from an inner vessel material having a cylindrical middle part with a cylinder axis and having first and second terminal caps that seal the cylindrical middle part so as to provide a storage volume, the inner vessel comprising an outer layer that is applied thereto in order to reinforce the inner vessel, wherein a valve connection piece is provided on the second terminal cap so as to receive a valve in order to seal the storage volume;
 guiding a hollow flushing lance that is open to the outside through the valve connection piece, wherein the flushing lance is configured so as to protrude into the storage volume and is provided with a perforation along its entire length up to a first end of the flushing lance facing the first terminal cap, which lies opposite the valve connection piece in the storage volume for a gas exchange with the storage volume, wherein an additional weight is arranged on the first end of the flushing lance, and wherein the flushing lance extends so far to the first terminal cap that the gas exchange is performed throughout the perforation of the flushing lance up to the first terminal cap; and
 fixing the flushing lance to the valve connection piece so that the flushing lance is held by the valve connection piece in a sealing manner with respect to the valve connection piece.

* * * * *